(12) United States Patent
Najmolhoda et al.

(10) Patent No.: US 8,371,331 B2
(45) Date of Patent: Feb. 12, 2013

(54) SOLENOID OPERATED FLUID CONTROL VALVE

(75) Inventors: Hamid Najmolhoda, Grand Rapids, MI (US); David Seid, Conklin, MI (US); John T. Kovitz, Walker, MI (US); Brian K. Baker, Coopersville, MI (US)

(73) Assignee: Saturn Electronics & Engineering, Inc., Auburn Hills, MI (US)

( * ) Notice: Subject to any disclaimer, the term of this patent is extended or adjusted under 35 U.S.C. 154(b) by 0 days.

(21) Appl. No.: 13/374,391

(22) Filed: Dec. 27, 2011

(65) Prior Publication Data

US 2012/0104296 A1    May 3, 2012

Related U.S. Application Data

(63) Continuation of application No. 11/314,977, filed on Dec. 21, 2005, now Pat. No. 8,127,791.

(51) Int. Cl.
*F16K 31/02* (2006.01)

(52) U.S. Cl. .. 137/596.17; 251/48; 251/65; 251/129.15; 251/333

(58) Field of Classification Search .............. 251/48, 251/65, 129.14–129.15, 333; 137/596.17
See application file for complete search history.

(56) References Cited

U.S. PATENT DOCUMENTS

| | | | |
|---|---|---|---|
| 2,868,494 A | 1/1959 | Kearns et al. | 251/64 |
| 3,212,751 A * | 10/1965 | Hassa | 251/65 |
| 4,338,966 A | 7/1982 | Smith | 137/596.17 |
| 4,610,267 A | 9/1986 | Beck et al. | 137/596.17 |
| 4,988,074 A | 1/1991 | Najmolhoda | 251/129.08 |
| 4,988,559 A | 1/1991 | Nemoto et al. | 428/219 |
| 5,076,323 A * | 12/1991 | Schudt | 137/596.17 |
| 5,104,091 A * | 4/1992 | Rathay et al. | 251/129.14 |
| 5,131,624 A * | 7/1992 | Kreuter et al. | 251/129.18 |
| 5,135,027 A | 8/1992 | Miki et al. | 137/596.17 |
| 5,606,992 A | 3/1997 | Erickson et al. | 137/596.17 |
| 5,609,400 A | 3/1997 | Hashida | 303/119.2 |
| 5,611,370 A | 3/1997 | Najmolhoda | 137/625.61 |
| 5,651,391 A * | 7/1997 | Connolly et al. | 137/625.65 |
| 5,687,698 A | 11/1997 | Mastro et al. | 123/568.26 |
| 5,711,344 A | 1/1998 | Mullally | 137/596.17 |
| 5,738,142 A | 4/1998 | Eike et al. | 137/596.17 |
| 5,915,416 A * | 6/1999 | Okazaki et al. | 137/596.17 |
| 5,950,984 A * | 9/1999 | Anderson et al. | 251/129.14 |
| 5,984,259 A | 11/1999 | Najmolhoda et al. | 251/50 |
| 5,996,628 A | 12/1999 | Najmolhoda et al. | 137/625.61 |
| 6,000,674 A | 12/1999 | Cheng | 251/26 |
| 6,076,490 A | 6/2000 | Esch et al. | 251/129.15 |
| 6,179,268 B1 | 1/2001 | Seid | 251/65 |
| 6,209,563 B1 | 4/2001 | Seid et al. | 137/15.21 |
| 6,213,447 B1 * | 4/2001 | Bircann et al. | 251/84 |
| 6,220,300 B1 | 4/2001 | Schudt et al. | 137/884 |
| 6,293,514 B1 | 9/2001 | Pechoux et al. | 251/122 |

(Continued)

FOREIGN PATENT DOCUMENTS

DE      35 03 785       8/1986
DE      37 22 344       1/1989

(Continued)

*Primary Examiner* — John Bastianelli

(57) ABSTRACT

Solenoid operated fluid control valve for controlling the pressure of a fluid in a fluid control system comprises a solenoid housing having therein a solenoid coil, an armature movable in response to electrical current applied to the solenoid coil, a valve member for controlling fluid flow to a fluid passage, an actuator pin disposed between the armature and the valve member for moving the valve member in response to armature movement, and one or more features including an armature damping member, tubular actuator pin support body, flow diverter, coil bobbin support sleeve, and/or internal particle gettering magnet to improve valve operation.

7 Claims, 8 Drawing Sheets

U.S. PATENT DOCUMENTS

| | | | |
|---|---|---|---|
| 6,321,767 B1 | 11/2001 | Seid et al. | 137/15.21 |
| 6,328,065 B1 | 12/2001 | Schmid et al. | 137/596.17 |
| 6,337,012 B1 | 1/2002 | Devine | 210/223 |
| 6,418,967 B1 | 7/2002 | Frei et al. | 137/625.65 |
| 6,427,972 B1 | 8/2002 | Kirschner | 251/129.15 |
| 6,435,472 B1 | 8/2002 | Najmolhoda et al. | 251/50 |
| 6,581,634 B2 | 6/2003 | Najmolhoda | 137/545 |
| 6,592,095 B2 | 7/2003 | Kabasin et al. | 251/64 |
| 6,619,616 B1 * | 9/2003 | Sudani et al. | 251/129.14 |
| 6,719,006 B2 * | 4/2004 | Fleischer et al. | 137/596.17 |
| 6,817,592 B2 | 11/2004 | Mianzo et al. | 251/54 |
| 6,827,102 B2 | 12/2004 | Weber | 137/596.17 |
| 6,904,934 B2 | 6/2005 | Runge et al. | 137/596.17 |
| 7,673,597 B2 | 3/2010 | Najmolhoda | 123/90.12 |
| 2002/0113677 A1 | 8/2002 | Holmes et al. | 335/256 |
| 2002/0189575 A1 | 12/2002 | Rayl et al. | 123/198 |
| 2003/0037825 A1 * | 2/2003 | Runge et al. | 137/596.17 |
| 2003/0127614 A1 | 7/2003 | Haeberer et al. | 251/50 |
| 2003/0160673 A1 | 8/2003 | Ott | 335/256 |
| 2004/0045611 A1 | 3/2004 | Avila | 137/596.17 |
| 2004/0090296 A1 | 5/2004 | Ojima et al. | 335/256 |
| 2004/0104371 A1 | 6/2004 | Hironaka | 251/129.15 |
| 2005/0034769 A1 | 2/2005 | Moreno et al. | 137/596.17 |
| 2005/0067028 A1 | 3/2005 | Ryuen et al. | 137/596.17 |

FOREIGN PATENT DOCUMENTS

| | | |
|---|---|---|
| DE | 197 33 660 | 2/1999 |
| DE | 197 44 696 | 4/1999 |
| DE | 100 34 959 | 2/2002 |
| DE | 101 53 247 | 5/2003 |
| EP | 0 645 291 | 3/1995 |
| EP | 0 976 013 | 2/2000 |
| EP | 1 004 066 | 5/2000 |
| EP | 1 301 837 | 4/2003 |
| GB | 861078 | 2/1961 |
| KR | 521748 | 4/1998 |
| KR | 531970 | 7/1998 |
| WO | WO 97/09275 | 3/1997 |
| WO | WO 98/48332 | 10/1998 |
| WO | WO 99/08169 | 2/1999 |
| WO | WO 02/06911 | 1/2002 |

* cited by examiner

SOLENOID OPERATED FLUID CONTROL VALVE

RELATED APPLICATION

This application is a continuation application of application Ser. No. 11/314,977 filed Dec. 21, 2005 now U.S. Pat. No. 8,127,791.

FIELD OF THE INVENTION

The present invention relates to a solenoid operated fluid control valve that controls fluid pressure in a fluid system in response to electrical current applied to a valve solenoid.

BACKGROUND OF THE INVENTION

A proportional variable force solenoid control valve that is relative low in cost to manufacture and compact in size while maintaining substantially linear proportional fluid control is described in the Najmolhoda U.S. Pat. No. 4,988,074. The patented proportional variable force solenoid control valve comprises an outer steel solenoid housing and an aluminum valve member housing joined together mechanically such as by tabs on the steel solenoid housing being crimped about regions of the aluminum valve member housing.

The proportional variable force control valve includes a ferromagnetic (e.g. steel) armature suspended by low spring rate springs at opposite ends of the armature within the bore hole of a coreless solenoid bobbin for reciprocable movement between positions corresponding to a closed valve position and fully open valve position in response to applied electrical current to an electromagnetic coil. The position of the armature is controlled by balancing the variable force of an electromagnetic field of an electromagnetic coil and the force of the magnetic field of a permanent ring magnet against the force of a compression coil spring which biases the valve toward the closed position of the valve. The electromagnetic coil, bobbin and armature reside in the steel solenoid housing in a manner that the steel housing provides a concentration of flux of the electromagnetic field at the armature. The fluid control valve on the end of the armature moves relative to a valve seat disposed in the aluminum valve housing to communicate a fluid inlet to fluid exhaust ports so as to regulate fluid pressure at fluid control ports in a manner proportional to the magnitude of applied electrical current.

A commercially manufactured version of the aforementioned patented proportional variable force solenoid fluid control valve has been modified to include a stainless steel ball valve and a separate stainless steel valve seat insert pressed in the nozzle. The ball valve is captured in a stainless steel cage between the valve seat and a rod-like, cylindrical shaped steel armature that moves relative to the valve seat in a manner proportional to the magnitude of electrical current applied to the electromagnetic coil. As the armature moves relative to the valve seat to actuate the valve, the ball valve is caused to follow the end of the armature by virtue of fluid pressure in the valve member housing and confinement in the ball valve cage in the bobbin. The fluid inlet is communicated to fluid exhaust ports by opening of the ball valve so as to regulate fluid pressure at fluid control ports in a manner proportional to the magnitude of electrical current applied to the coil.

A spool valve is disposed in the valve member housing for providing a two stage, high flow capability wherein pressurized fluid supplied to the inlet port initially is directed to bypass the control ports and flows to an end of the spool valve to move it from a zero fluid flow spool position to a maximum fluid flow spool position relative to the control ports as determined by the cracking pressure preset for the ball valve by adjustment of the coil spring force. Thereafter, a second stage of operation involves controlling the fluid flow through the control ports by moving the spool valve between minimum and maximum flow spool positions in a manner proportional to the magnitude of electrical current to the coil. Such proportional variable force solenoid control valves commercially manufactured to-date are operably mounted to a cast aluminum transmission body or case by a clamp plate, bolt, or both engaging an outer nozzle groove.

The Najmolhoda U.S. Pat. No. 5,611,370 describes a proportional variable force solenoid control valve that includes a substantially non-magnetic common housing for the solenoid and control valve, simplifying valve manufacture and construction while maintaining substantially linear proportional fluid pressure control.

The Najmolhoda U.S. Pat. No. 5,984,259 also describes a proportional variable force solenoid control valve that includes a damping member connected to or part of the armature to provide improved valve response stability to noise in the controlled fluid system, especially in use in an electronically controlled hydraulic automatic transmission application.

Mullaly U.S. Pat. No. 5,711,344 describes a hydraulic pressure regulating valve having a dual ball and pin arrangement operatively associated with the armature.

SUMMARY OF THE INVENTION

The present invention provides a solenoid operated fluid control valve for controlling the pressure of a fluid in a fluid control system wherein the fluid control valve includes features to improve valve operation.

Pursuant to an embodiment of the invention, the solenoid fluid control valve includes a solenoid coil, an armature movable in response to electrical current applied to the solenoid coil, a valve member for controlling fluid flow to a fluid passage, an actuator pin disposed between the armature and the valve member for moving the valve member in response to armature movement, and further features that a damping member is associated with the armature proximate an end thereof so as to move therewith and is received in a fluid-containing damping chamber formed by a tubular actuator pin support body in a fluid-containing housing of the fluid control valve. The actuator pin support body includes in one embodiment a first tubular sleeve section disposed about the damping member for forming the damping chamber and a second tubular sleeve section disposed about the actuator pin for forming a bearing sleeve to receive the actuator pin. The damping member resides in the damping chamber in a manner to reduce or dampen pressure oscillations resulting from electrical, mechanical and/or hydraulic noise in the controlled fluid system or circuit, thereby improving valve response stability.

Pursuant to another embodiment of the present invention, the solenoid fluid control valve includes a solenoid coil, an armature movable in response to electrical current applied to the solenoid coil, a valve member for controlling fluid flow to a fluid passage, an actuator pin disposed between the armature and the valve member for moving the valve member in response to armature movement, and further features that the actuator pin includes a sleeve fixedly attached thereto so as to move therewith and having an annular sealing edge to engage a flat, fixed exhaust seat insert downstream of the valve member to close off fluid flow to an exhaust port when the armature is at an end position of its stroke where the valve member is unseated a maximum distance from its seat by the actuator pin. The sealing edge can be formed by chamfering or radiusing an end of the sleeve. The exhaust sealing edge/exhaust seat insert reduce leakage of fluid to the exhaust port when the valve member is unseated a maximum distance from its seat.

Pursuant to still another embodiment of the invention, the solenoid fluid control valve includes a solenoid coil, an armature movable in response to electrical current applied to the solenoid coil, a valve member for controlling fluid flow to a fluid passage, an actuator pin disposed between the armature and the valve member for moving the valve member in response to armature movement, and the further feature that a particle gettering magnet is disposed inside a fluid-containing housing of the fluid control valve to capture ferrous particles in the fluid. In an embodiment of the invention, the particle gettering magnet is disposed about a tubular bearing sleeve receiving the actuator pin so as to capture ferrous particles that may be present in the fluid proximate the bearing sleeve.

Pursuant to still a further embodiment of the present invention, the solenoid operated fluid control valve includes a solenoid coil, an armature movable in response to electrical current applied to the solenoid coil, a valve member for controlling fluid flow to a fluid passage, an actuator pin disposed between the armature and the valve member for moving the valve member in response to armature movement, and the further feature that a flow diverter is disposed in the fluid passage adjacent the valve member for imparting turbulent flow to fluid in the fluid passage to improve valve response stability at low control pressure. In an embodiment of the invention, the flow diverter is disposed in the fluid passage to support an end region of the actuator pin adjacent the valve member. An opposite end region of the actuator pin is supported by a bearing sleeve proximate the armature such that an inner end of the armature can be supported by hydrodynamic fluid pressure to reduce hysteresis losses in operation of the fluid control valve.

Pursuant to still a further embodiment of the present invention, the solenoid operated fluid control valve includes a solenoid coil, an armature movable in response to electrical current applied to the solenoid coil and the further feature that a tubular solenoid coil bobbin support sleeve or liner is disposed between the coil bobbin and the armature to maintain valve response stability over time at temperatures to which the valve components are exposed in service. The sleeve or liner completes a solid axial stacking path from a permanent magnet to a flux washer in a manner to reduce possible thermal drift of the permanent magnet that could affect valve response over time. A space or gap preferably also is provided between an end of the coil bobbin and the adjacent flux washer to help avoid harmful thermal drift of the permanent magnet.

The invention envisions a solenoid operated fluid control valve having one or more of the above features. Moreover, the invention envisions in other embodiments a proportional variable force solenoid operated fluid control valve of the type having a permanent magnet disposed in a solenoid housing of the control valve housing about an outer end region of the armature to provide a permanent magnetic field with which the variable electromagnetic field of the solenoid coil interacts to move a spring-biased armature in a manner proportional to the electrical current supplied to the solenoid coil and further having one or more of the above features.

The foregoing and other features and advantages of the invention will become apparent from the following more detailed description taken with the accompanying following drawings.

DESCRIPTION OF THE INVENTION

Features and embodiments of the invention will be described below in connection with a particular proportional variable force solenoid fluid control valve of the type having a permanent magnet disposed in a solenoid section of the control valve housing to provide a permanent magnetic field with which the variable electromagnetic field of the solenoid coil interacts to move a spring-biased armature in a manner proportional to the electrical current supplied to the solenoid coil. Proportional variable force solenoid fluid control valves of this type are described in U.S. Pat. Nos. 4,988,074; 5,611, 370; 5,984,259; 5,996,628; and 6,179,268. However, the invention is not limited to practice with such proportional variable force solenoid fluid control valves in that the invention can be practiced with other types of solenoid operated fluid control valves for controlling fluid pressure in a fluid system in response to electrical current applied to a solenoid.

Figure 1:
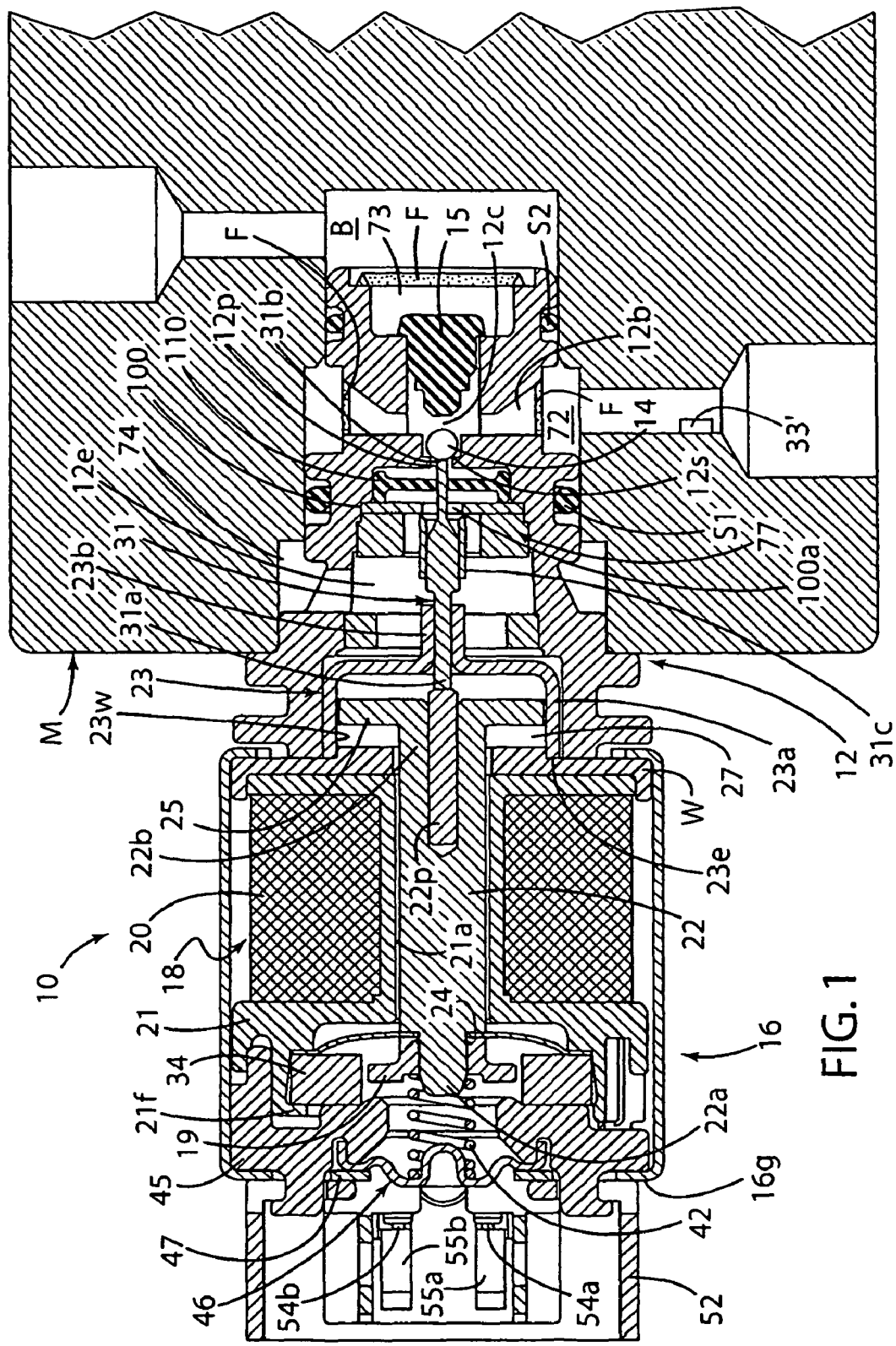
FIG. 1 is a longitudinal cross-section view of a proportional variable force solenoid fluid control valve illustrating certain embodiments of the present invention showing the ball valve member in a full open position.
Figure 2:
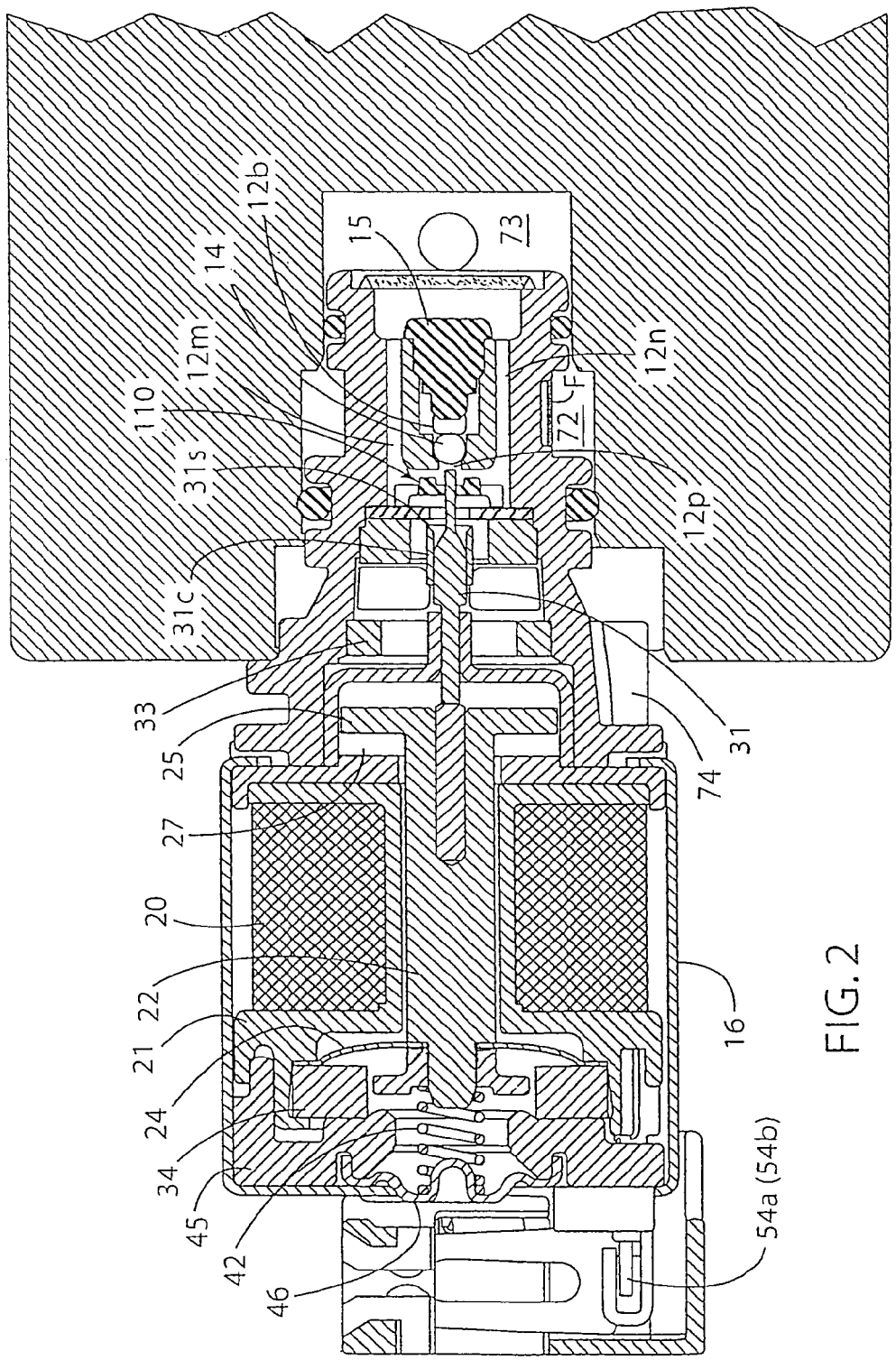
FIG. 2 is longitudinal cross-section view of the proportional variable force solenoid fluid control valve of FIG. 1 taken 90 degrees to the plane of FIG. 1 showing the ball valve member in a closed position.

Referring to FIGS. 1-2, an illustrative proportional variable force solenoid fluid control valve 10 includes a valve or nozzle housing 12 having a fluid valve member 14 and associated components therein and a solenoid housing 16 having a solenoid 18 disposed therein in a manner to provide a fluid control valve of the general types described in the above U.S. Pat. Nos. 4,988,074; 5,611,370; 5,984,259; 5,996,628; and 6,179,268, of common assignee herewith, the teachings of which are incorporated herein by reference. The valve housing 12 can be made of aluminum, while the solenoid housing 16 can comprise steel or other ferromagnetic material pursuant to U.S. Pat. No. 4,988,074. The valve housing 12 and solenoid housing 16 are joined together at radial annular solenoid housing flanges and radial annular valve housing flanges as shown in the above U.S. Pat. Nos. 4,988,074; 5,611,370; etc. The valve housing 12 and the solenoid housing 16 alternatively can be formed as a single, common housing, pursuant to Najmolhoda U.S. Pat. No. 5,611,370 with the common housing made of a substantially non-magnetic material with little or no magnetic permeability.

A material particularly suited for such a common or single housing comprises aluminum and its alloys or thermoplastic formed by casting or injection molding to required housing configuration. The common housing will include a housing section or region for enclosing the solenoid 18 and a nozzle housing section or region for enclosing the valve member 14 and associated valve components.

Referring to FIGS. 1-2, the solenoid 18 is disposed in the solenoid housing 16 (or solenoid housing section of the common housing embodiment) and includes an electromagnetic solenoid coil wound about a molded plastic bobbin 21 which has a cylindrically shaped bore hole 21a through the longitudinal axis thereof. The bobbin 21 is made of glass filled thermoplastic or any other suitable material. An axially elongated armature 22 formed of a ferromagnetic material (e.g. magnetically permeable steel) is suspended within the bore hole 21a by a thin low spring rate spring 24 mounted at a rear, outermost end 22a of the armature.

A plastic electrical connector body 52 is mounted on the bobbin 21 by snap fit, mechanical interlock, heat staking, or other fastening method. The electrical connector body 52 includes electrical terminal contact pins 54a, 54b connected to the wires of the electromagnetic coil 20 for receiving an electrical current signal from a variable current source (not shown). Electrical contacts are shown in the aforementioned U.S. Pat. No. 4,988,074. The contact pins 54a, 54b in turn are connected to respective electrical terminals 55a, 55b for connecting the fluid control valve to a source of electrical current signals. For purposes of illustration and not limitation, the terminals 55a, 55b can be connected to a conventional electronic transmission control module (not shown) of a motor vehicle by a lead frame or wiring harness when the fluid control valve is used to control a vehicle transmission. In this application, the valve housing 12 of the fluid control valve is received in a bore B of a transmission fluid manifold M with seals S1, S2 engaging the transmission manifold and separating the fluid supply circuit, the fluid control circuit, and the fluid exhaust circuit from one another.

For purposes of illustration and not limitation, the plate spring 24 is of the type described in the aforementioned U.S. Pat. No. 4,988,074 and is formed from very thin non-magnetic austenitic stainless steel, such as full hard austenitic stainless steel, which provides a very low rate spring for the spring configuration shown in FIG. 5 of the aforementioned '074 patent. The inner periphery of the plate spring 24 is mounted between a steel annular retainer member 19 and the outer end of armature 22. The outer periphery of the plate spring 24 is mounted between an end surface of bobbin 21 and the axially magnetized permanent magnet ring 34 so as to suspend the armature 22 for free axial longitudinal movement within the bobbin 21. The bobbin 21 includes a heat-staked flange 21f that holds the permanent magnet ring in position.

The axially magnetized permanent magnet ring 34 is disposed in the solenoid housing at the outer end 22a of the armature 22 axially rearward of the solenoid coil 20 and about at least a portion of the armature end. For purposes of illustration and not limitation, the permanent magnet ring 34 is formed of rare earth permanent magnet material, such as Sm—Co or $Nd_2Fe_{14}B$, permitting use of a reduced size magnet that results in a compact solenoid. The permanent magnet ring 34 produces a permanent magnetic field that substantially saturates the armature 22 even in the absence of electrical current to the coil 20. Thus, a relatively smaller magnetic field is required to move the armature 22 between the axial end position of the armature stroke shown in FIG. 1 where valve member 14 is unseated relative to its valve seat and an axial position to the left in FIG. 2 where valve member 14 is seated on its valve seat. In the position of FIG. 1, the valve member 14 is open to allow communication between supply port 72 and the control port 73 as regulated by an exhaust valve member as described below. In the position of FIG. 2, the valve member 14 is closed on its seat to interrupt communication between supply port 72 and the control port 73.

The permanent magnet ring 34 also is clamped against the bobbin by an end closure 45 held on the solenoid housing 16 by housing flange 16g crimped over the end closure. The end closure 45 includes a deformable end cap 46 that engages an outer end of a coil compression spring 42 (spring biasing means). The end closure 46 is held on the end closure 45 by being trap fit or captured by housing 16. The spring 42 is trapped between the armature outer end 22a and the deformable end cap 46. The central region of the deformable end cap 46 is deformed after assembly of the valve to adjust valve response to solenoid current as described in U.S. Pat. No. 5,996,628, the teachings of which are incorporated herein by reference. The armature 22 is biased by coil spring 42 to place the valve member 14 in the open position off its seat when the solenoid coil 20 is deenergized as described below.

The opposite front, inner end 22b of the armature is unsupported, except by hydrodynamic fluid pressure in the bore of the bobbin 21. Support of the armature 22 in this manner reduces friction effects on armature movement and thus hysteresis losses in operation of the fluid control valve. The flux washer W may be provided adjacent the bobbin 21 pursuant to aforementioned U.S. Pat. No. 4,988,074, incorporated herein by reference, to concentrate electromagnetic flux at the inner end 22b of the armature 22.

The inner end 22b of the armature includes a cylindrical armature pin 22p made of carbon steel and is fastened (e.g. press fit) thereto so as to move with the armature 22. The armature pin 22p extends along the central longitudinal axis of the fluid control valve 10 and protrudes slightly beyond the inner end of the armature 22.

As shown in FIGS. 1-2, a fluid damping member 25 is associated with the inner end of the armature 22 so as to move with the armature. The damping member 25 can be formed integral with the inner end 22b of the armature 22 as shown, or can be connected or abutted thereto so as to move with the armature 22 if the damping member is a separate element as described in U.S. Pat. No. 5,984,259.

Pursuant to an embodiment of the invention, the damping member 25 resides in a fluid damping chamber 27 defined by an inner wall 23w of tubular actuator pin support body 23 disposed in the fluid-containing valve or nozzle housing valve 12, or valve or nozzle section of a common housing. The tubular actuator pin support body 23 is described in more detail below. The damping member 25 is disposed in the damping chamber 27 in a manner to reduce or dampen pressure oscillations resulting from electrical, mechanical and/or hydraulic noise in the controlled fluid system or circuit as described in U.S. Pat. No. 5,984,259, thereby improving valve response stability. In an electronically controlled automobile transmission application, electromechanical noise in the controlled system or circuit can originate in the transmission control module (e.g. a chopped pulse width control signal) and oscillations of the clutch or shift valves in the transmission body and produce fluid pressure oscillations and a non-linear valve response.

For purposes of illustration and not limitation, the armature damping member 25 has a cylindrical outer periphery adjacent the inner cylindrical wall 23w. The cross-sectional area of the damping member 25 and the clearance between the cylindrical outer periphery of the damping member 25 and the cooperating wall 23w are selected effective to reduce or damp pressure oscillations resulting from noise in the controlled fluid system or circuit, which pressure oscillations can result in non-linear valve response performance as described in U.S. Pat. No. 5,984,259. An exemplary cross-sectional area of the damping member 25 (cross-sectional area calculated using the outer diameter of damping member 25) can be 0.039 inch$^2$ (0.54 inch outer diameter of damping member). For this exemplary cross-sectional area of the damping member 25, an exemplary radial clearance of approximately 0.005 inch can be provided between the outer periphery of the damping member 25 and the inner wall 23w for the proportional variable force solenoid fluid control valve shown in FIGS. 1-2 adapted for use in a hydraulic automatic transmission application for controlling a gear shifting hydraulic circuit, although the invention is not limited in this regard. In effect, the damping chamber 27 and the damping member 25 provide a trapped volume of fluid comprising predominantly hydraulic fluid which must be moved through the restricted clearance area between the outer periphery of the damping member 25 and the inner wall 23w and in doing so reduces or damps pressure oscillations resulting from electrical, mechanical, and/or hydraulic noise in the controlled fluid system or circuit.

As mentioned, the armature 22 is supported by spring plate 24 and by hydrodynamic fluid pressure in the bobbin 23 to reduce hysteresis losses in operation of the fluid control valve 10.

Pursuant to an embodiment of the invention, a non-magnetically permeable actuator pin 31 is supported independently of the armature 22 in the valve or nozzle housing 12, or valve section of a common housing. For purposes of illustration and not limitation, the actuator pin can be made of austenitic stainless steel or other material having little or no magnetic permeable compared to the steel or iron armature to this end. The actuator pin 31 and armature 22 are coaxial so to move along a common longitudinal axis of the fluid control valve 10.

The actuating pin 31 is independently supported from the armature 22 by actuator pin support body 23. In particular, the support body 23 includes a relatively large diameter, axially extending tubular cup-shaped section 23a that forms the damping chamber 27 therein and a relatively smaller diameter, axially extending tubular section 23b that forms a bearing tube or sleeve that is coaxial with the longitudinal axis and that receives a cylindrical end 31a of the actuator pin 31 in a precision bearing fit. The tubular cup-shaped section 23a includes inner wall 23w that coacts with the damping member 25 as described above and an end wall 23e that abuts flux washer W. The actuator pin support body 23 is held in position in the valve or nozzle housing 12, or section of the common housing, by being trap fit (captured) therein. For purposes of illustration and not limitation, the actuator pin support body 23 is made of machine grade or form grade half hard brass material.

The other opposite cylindrical end 31b of the actuator pin 31 is supported by a flow diverter 110 residing adjacent valve member 14 as will described further below. The actuator in 31 thereby is independently supported for movement along the longitudinal axis during operation of the fluid control valve 10.

Pursuant to another embodiment of the invention, a particle gettering magnet 33 is disposed inside fluid-containing valve or nozzle section 12, or valve section of a common housing, to capture ferrous particles in the fluid inside the fluid control valve 10. In FIGS. 1-2, the particle gettering magnet 33 is shown as a magnet ring disposed in the valve housing section 12 about the tubular bearing tube or sleeve 23b receiving the actuator pin 31 so as to capture ferrous particles that may be present in the fluid proximate the bearing tube or sleeve. The magnet ring is trap fit (captured), light interference press fit or otherwise secured in a bore of the valve or nozzle housing 12 to hold it in position about the bearing sleeve 23b. For purposes of illustration and not limitation, the particle gettering magnet can comprise a permanent magnet ring, such as $Nd_2Fe_{14}B$ or any type of magnet that attracts ferrous particles in the fluid to remove them from the fluid and thus from entering the bearing sleeve 23b. A second particle gathering magnet 33' can be disposed in the supply passage of the transmission manifold M to which the fluid control valve is communicated to remove ferrous particles from the supply fluid before they enter the valve or nozzle housing 12 via the supply port 72.

The valve or nozzle housing 12 is disposed in a bore or chamber in cast aluminum transmission housing manifold M, or other fluid control system. Outer O-ring seals S1, S2 on the valve housing 12 seal on the transmission housing manifold and separate the hydraulic fluid supply and control lines or conduits (not shown) of the transmission hydraulic circuit.

The valve or nozzle housing 12 includes at least one pressurized hydraulic fluid supply or inlet port 72, at least one control port 73, and at least one exhaust port 74. The supply or inlet port 72 communicates to an inner fluid chamber 12c of the valve or nozzle housing 12. To this end, annular supply port 72 is provided and communicates to one or more side supply passages 12b, which in turn communicate to the inner fluid chamber 12c.

The outer end of the fluid chamber 12c is closed by a threaded closure plug 15 threadably received in an end bore of the valve or nozzle housing 12. A valve member 14, which is illustrated as a ball valve, is confined for axial movement in the fluid chamber 12c between the closure plug 15 and a valve seat 12s.

Tubular fluid filter screen assembly F can be provided on the valve or nozzle housing 12 at the supply port 72 as well as the control port 73 as shown in U.S. Pat. Nos. 5,984,259 and 6,179,268, the teachings of which are incorporated herein by reference, to help capture harmful dirt and debris particles that may be present in the fluid.

Figure 3:
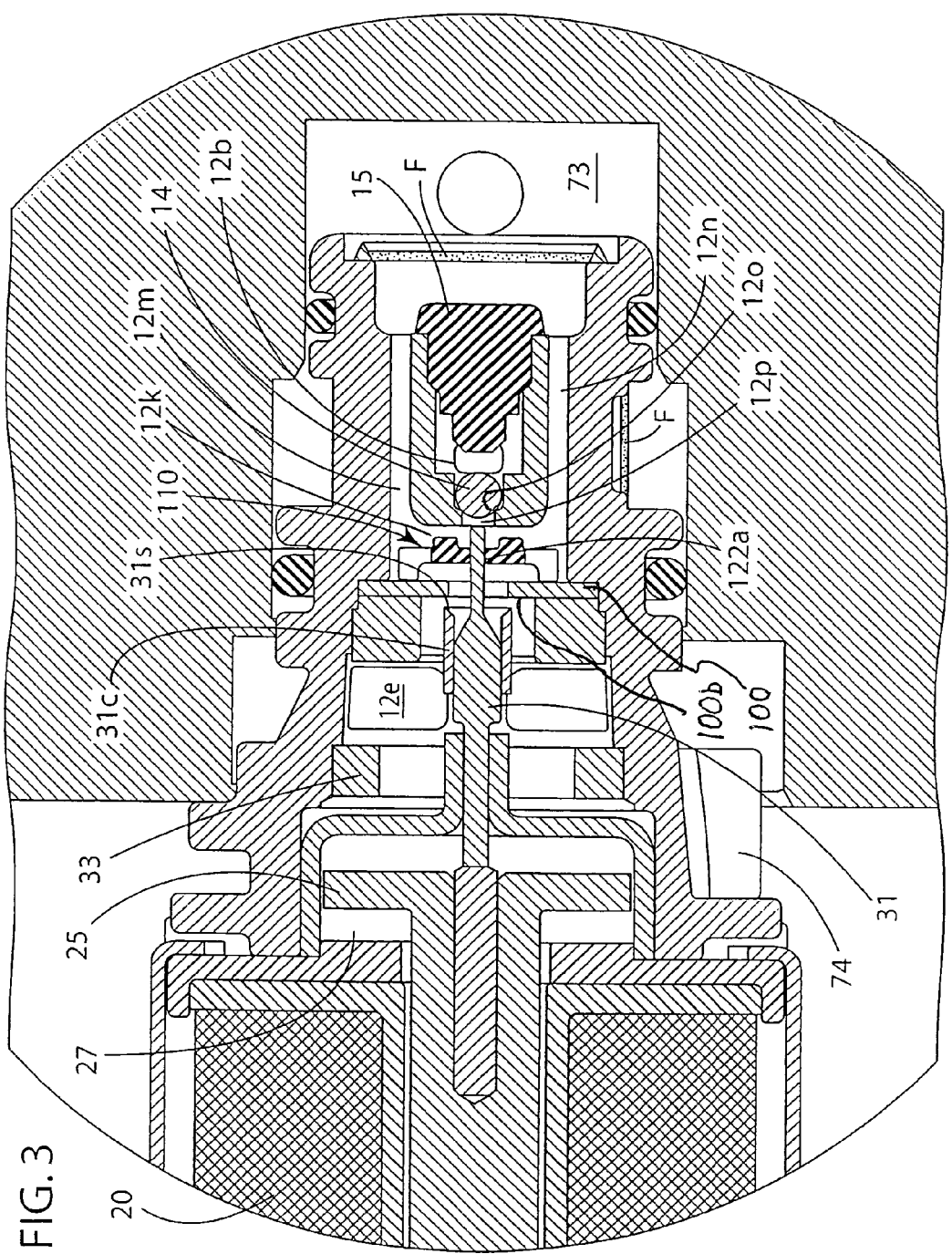
FIG. 3 is an enlarged view of the ball valve and flow diverter.

The inner fluid chamber 12c communicates to valve seat 12s such that the ball valve 14 controls fluid flow through orifice 12o of the valve seat 12s to axially extending cylindrical fluid passage 12p located downstream of the ball valve 14 in valve or nozzle housing 12, FIG. 3. The fluid passage 12p communicates via intermediate chamber or passage 12k to side or lateral passages 12m, 12n which communicate to the control port 73, FIG. 2. The fluid passage 12k thus is disposed between the supply port and the control port 73 in a fluid flow sense. The fluid passage 12k also is disposed between the supply port 72 and the exhaust port 74 in a fluid flow sense. In the illustrative embodiment shown in FIGS. 1-3, the fluid passage 12k functions as a pressure regulating passage.

Figure 4:
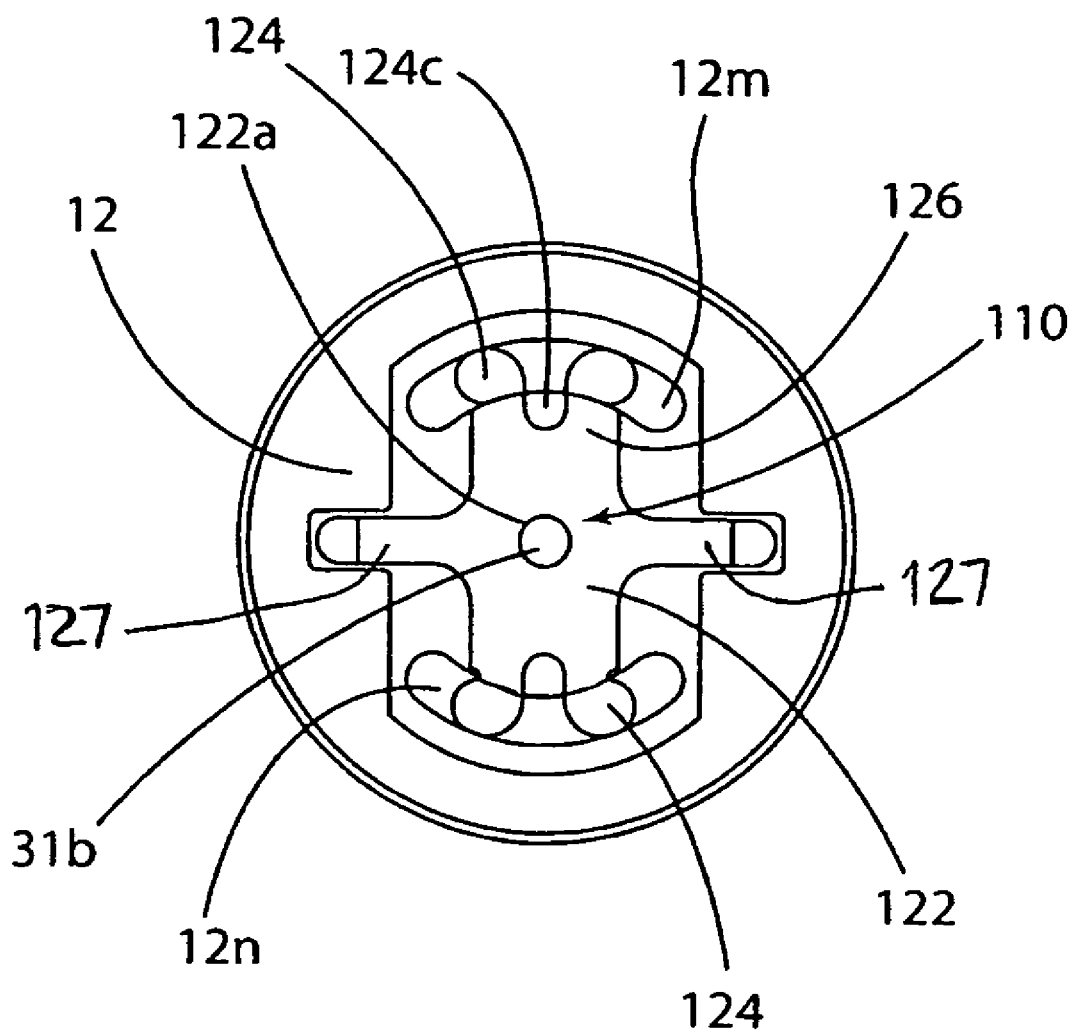
FIG. 4 is an end elevation of the flow diverter.

The actuator pin 31 extends from the bearing tube or sleeve 23b through an exhaust chamber 12e of the valve or nozzle housing 12, through an exhaust orifice 100a of an exhaust seat insert 100, through passage 122a of a flow diverter 110, FIG. 4, through passages 12k, 12p, and through the orifice 12o of the valve seat 12s where the outermost end of the actuator pin contacts the ball valve 14 so that the position of the ball valve 14 relative to its seat 12s is controlled by movement of the armature 22 in response and in proportion to the current level of the electrical current signals input to the solenoid coil 20.

The inner fluid chamber 12c communicates the fluid supply port 72 and fluid control port 73 in flow relation as permitted by ball valve 14. The exhaust orifice 100a of the exhaust seat insert 100 communicates the fluid passage 12p, 12k to the exhaust chamber 12e and thus the exhaust port 76 leading to a conventional sump or return tank (not shown) of the fluid control system. The exhaust seat insert 100 is held in position by retainer ring 77.

Figure 3C:
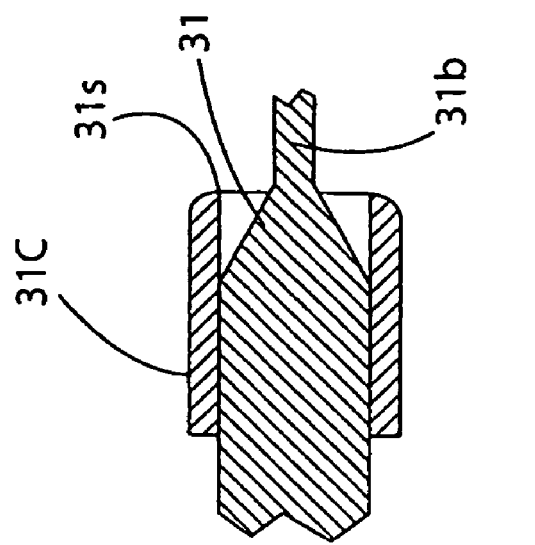
FIG. 3C is an enlarged partial sectional view of a radiused sealing edge formed on the sleeve.
Figure 3B:
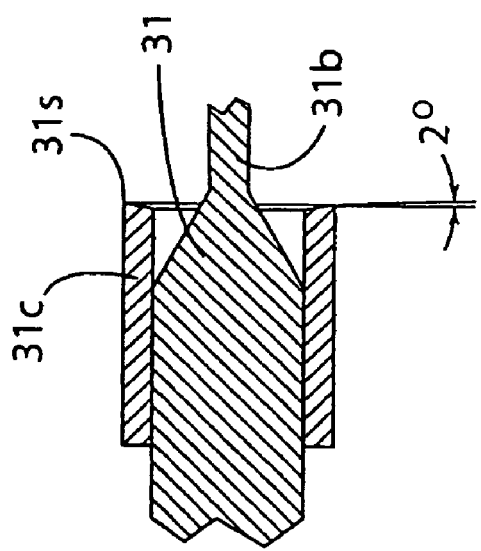
FIGS. 3A and 3B are enlarged partial sectional views of different chamfered sealing edges formed on the end of a sleeve.
Figure 3A:
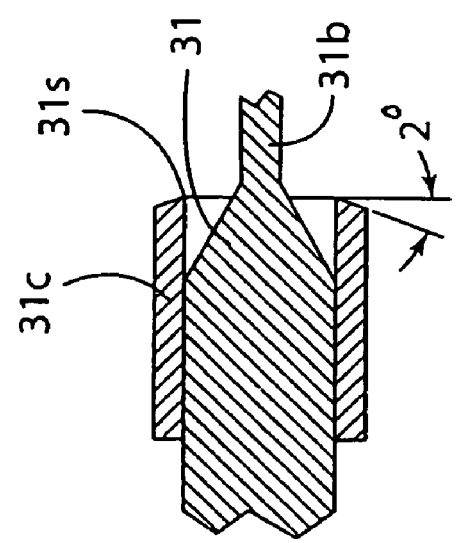

The actuating pin 31 includes cylindrical end region 31a received in the bearing tube or sleeve 23b, an opposite cylindrical end 31b that engages the ball valve 14, and a cylindrical tubular sleeve 31c press fit or otherwise fixedly attached on the enlarged region of the actuator pin disposed intermediate the ends 31a, 31b. The sleeve 31c includes an annular sealing edge 31s, FIG. 3, on an end thereof so as to engage the flat seating (backface) surface 100b of the exhaust seat insert 100 downstream of the valve member 14 to close off fluid flow to the exhaust port 74 when the valve member 14 is unseated a maximum distance from its seat 12s by the actuator pin as shown in FIG. 1. The flat seating surface 100b preferably extends perpendicular to the longitudinal axis of the actuator pin. The sealing edge 31s can be formed by chamfering the end of the sleeve 31c as shown in FIG. 3A or FIG. 3B, by providing a full radius on the end of sleeve 31c as shown in FIG. 3C, or by any other technique to provide a sealing edge 31s. For purposes of illustration and not limitation, a 2 degree or other chamfer can be provided on the end of sleeve 31c in FIG. 3A or FIG. 3B to form the sealing edge. The exhaust sealing edge 31s/exhaust seat insert surface 100b thereby reduce leakage of fluid to the exhaust port 74 when the valve member is unseated a maximum distance from its seat.

As mentioned above, the actuator pin 31 extends through a passage 122a of the fluid diverter 110, which is located in passage 12k spaced downstream of and in communication with fluid passage 12p so that fluid from passage 12p impinges on the side of the flow diverter. The flow diverter 110 imparts turbulent flow to fluid from the fluid passage 12p to counter possible changes in fluid viscosity (and higher fluid velocity) resulting from higher fluid temperatures during valve operation and/or effects of possible negative fluid pressures at low control pressures due fluid being exhausted at the exhaust port 74. The turbulence created by the flow diverter improves valve response stability by eliminating negative pressure (venturi effect) due to laminar flow to the exhaust.

The flow diverter 110 is shown in FIG. 4 to include a central hub 122 having an axial passage 122a through which end 31b of actuator pin 31 extends. The flow diverter also includes multiple lobes or arms 124 that extend from the hub and are spaced apart at the hub periphery to provide fluid flow channels 124c communicated to the exhaust orifice 100a. The fluid flow channels 124c provide a fluid flow path for fluid from the valve seat orifice 12o to the exhaust orifice 100a. The flow diverter is positioned in chamber 12k by posts 127 being received in recessed pockets in the nozzle housing 12, FIG. 4. The arms 124 have axially enlarged ends that abut on the facing side of the insert 100, FIG. 3. The flow diverter 110 includes one or more (a pair being shown in FIG. 3) of cylindrical standoff bosses 129 molded on the flow diverter side facing the passage 12p to maintain a flow path for fluid from passage 12p to passages 12m, 12n. For purposes of illustration and not limitation, the flow diverter 110 can be made of molded thermoplastic or other material.

FIG. 1 shows operation of the fluid control valve with no electrical current signal applied to the solenoid coil 20. The armature 22 and actuator pin 31 are moved in unison to the right in FIG. 1 by the bias of coil compression spring 42 toward a first armature end position of its stroke where the ball valve 14 is moved by actuator pin 31 to be at a maximum distance from its valve seat 120 (i.e. ball full open position relative to its seat). The distance is equal to the distance of the seat 12s to the sealed surface (backface) 100b of exhaust seat 100 plus the desired amount of ball travel. In this first position, the supply port 72 is fully communicated to control port 73, and the exhaust sealing edge 31s is sealed against the sealed surface (backface) 100b. This armature position provides the maximum fluid flow to the fluid passage 12p and thus to control ports 73, while there is little or no leakage of the fluid to the exhaust port 74 by virtue of the sealing edge 31s being sealed against the sealed surface (backface) 100b.

On the other hand, in operation of the fluid control valve of FIG. 2 with electrical current signal applied to the solenoid coil 20, the armature 22 is moved by interaction of the electromagnetic field of the solenoid coil and the permanent magnetic field toward the left in FIG. 1 against the bias of the coil spring 42 toward the other (second) end armature position of its stroke where the ball valve 14s is positioned at the closed position on its valve seat 12s by fluid pressure in fluid chamber 12c. The actuating pin 31 follows movement of the armature 22 to the left in FIG. 1 as a result of fluid pressure in the fluid chamber 12c.

Figure 5:
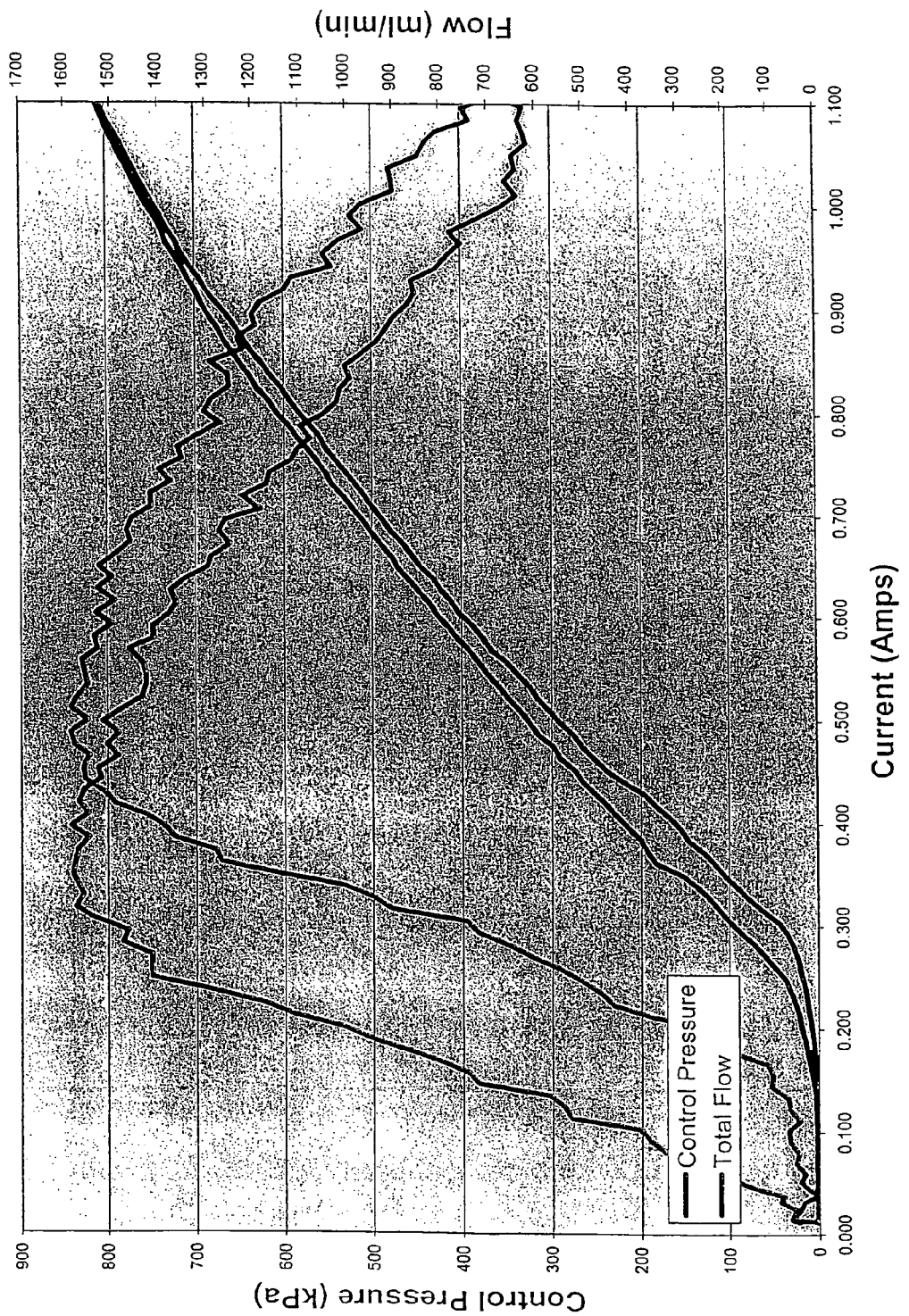
FIG. 5 is a graph of control pressure and total flow versus solenoid electrical current when the fluid control valve is operated in a proportional manner where control pressure increases in proportion to coil current.

Movement of the armature 22 between these first and second end positions of its stroke can be controlled in a linear proportional manner in dependence on electrical current provided to the solenoid coil. For example, in a proportional mode of operation with the ball valve 14 initially closed on seat 12s, electrical current is supplied to the coil 20 via the contacts 54a, 54b in a manner to create an electromagnetic field which cooperates with the permanent field and force of compression spring 42, which are opposed by force of plate spring 24 and fluid pressure on ball valve 14, to move the ball valve 14 away from its seat 12s in a linear proportional manner to the current level applied to coil 20 so as to, in turn, vary control pressure in a linear proportional manner where the control pressure increases with increasing solenoid current. For purposes of illustration and not limitation, FIG. 5 shows the control pressure and total flow versus electrical current to the solenoid in the proportional mode of operation where the control pressure increases with increasing solenoid current.

Figure 6:
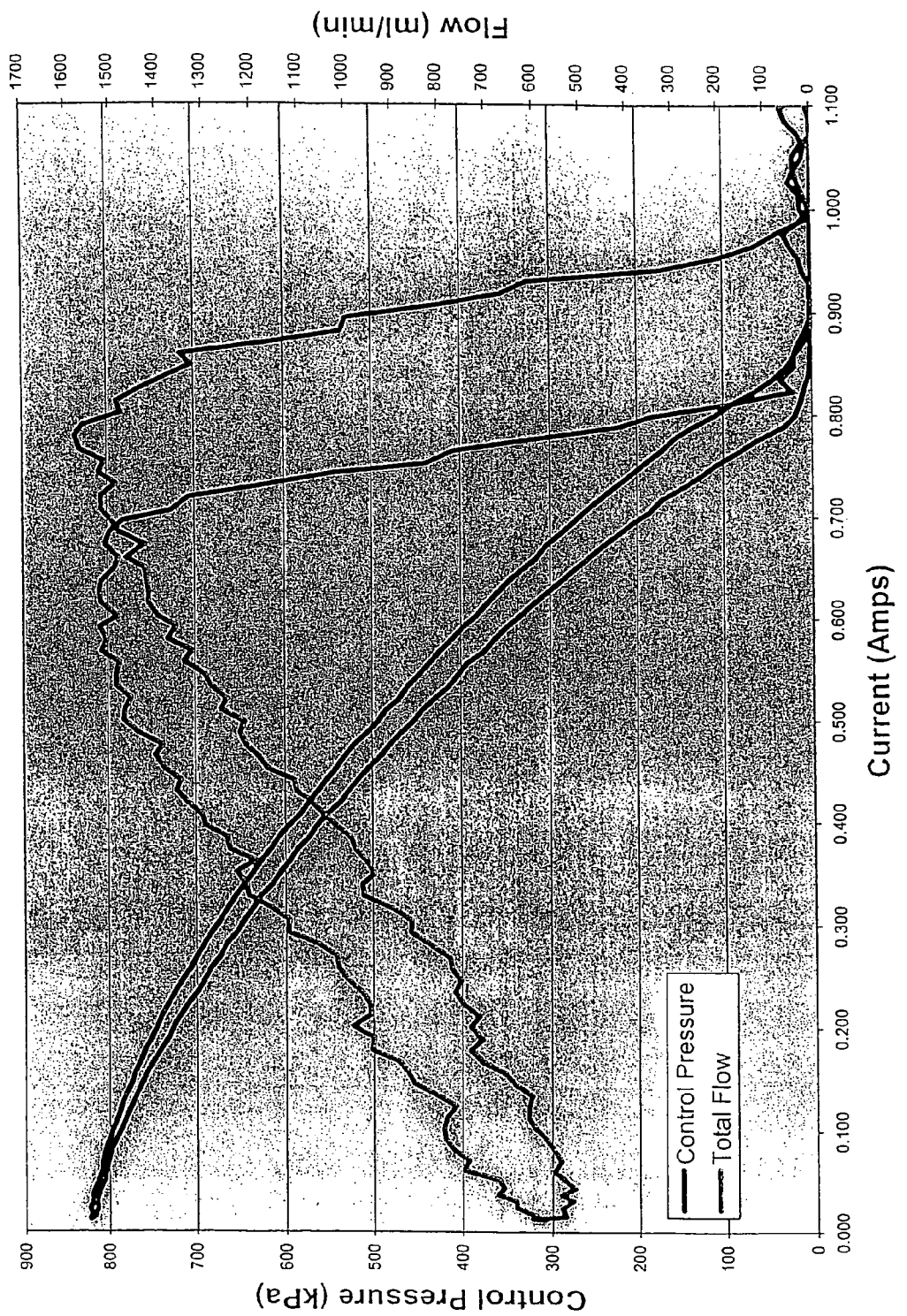
FIG. 6 is a graph of control pressure and total flow versus solenoid electrical current when the fluid control valve is operated in an inversely proportional manner where control pressure decreases in proportion to coil current.

A inversely proportional mode of operation with the ball valve 14 initially open can also be provided by the fluid control valve shown by either reversing the current flow direction through the solenoid coil 20 or reversing the direction of polarization of the permanent magnet 34 so that energization of the solenoid coil with electrical current moves the ball valve 14 from the open position to the closed position on the valve seat 12 in a linear proportional manner so as to, in turn, vary control pressure in an inverse linear proportional manner where the control pressure decreases with increasing solenoid current. For purposes of illustration and not limitation, FIG. 6 shows the control pressure and total flow versus electrical current to the solenoid in the inversely proportional mode of operation where the control pressure decreases with increasing solenoid current.

Figure 7:
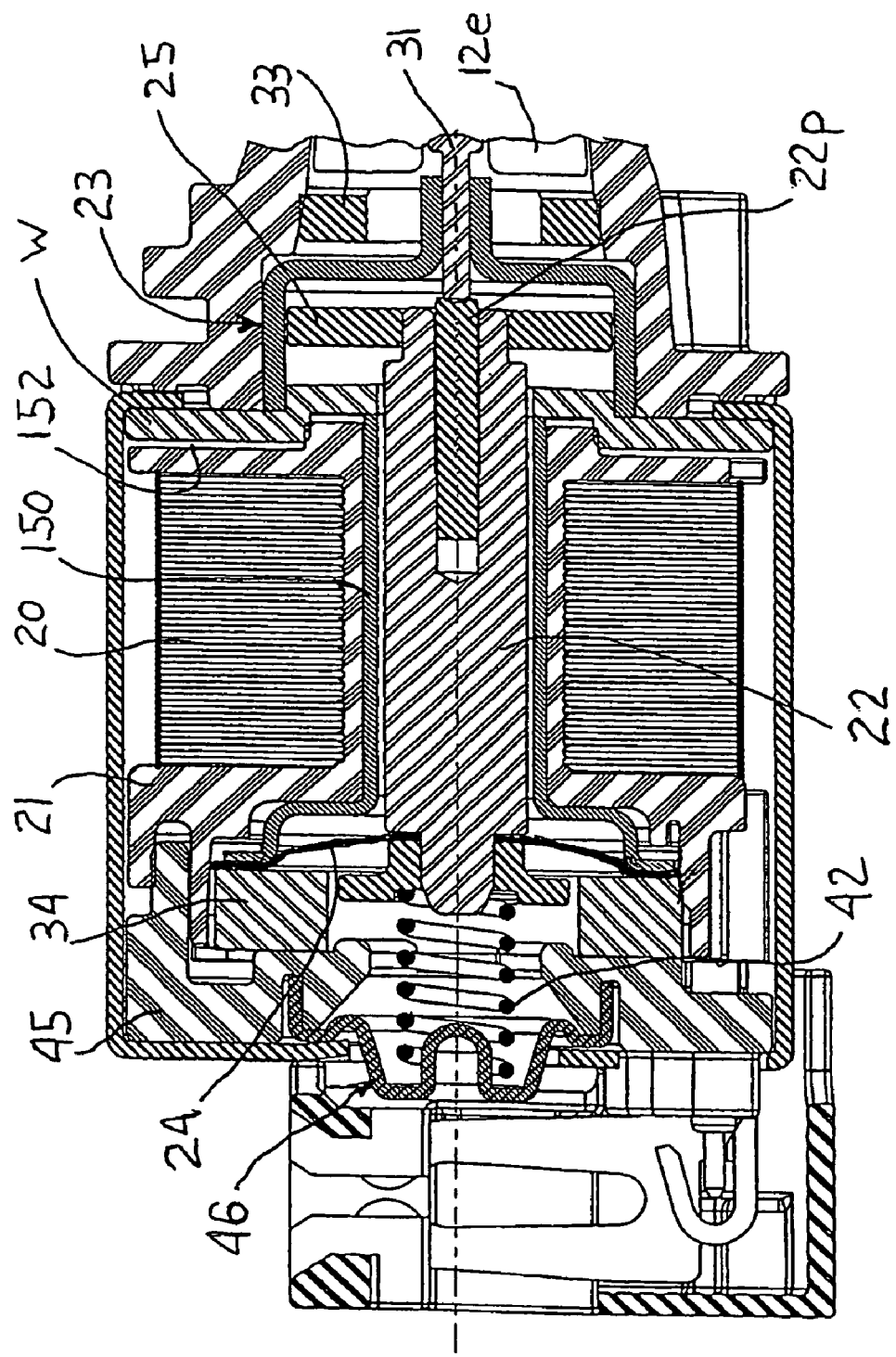
FIG. 7 is a partial longitudinal cross-section view of a proportional variable force solenoid fluid control valve illustrating another embodiment of the present invention having a sleeve or liner to provide a solid stacking path.

A solenoid operated fluid control valve pursuant to another embodiment of the invention is illustrated in FIG. 7 where like features bear like reference numerals. The solenoid operated fluid control valve differs from the embodiment of FIGS. 1-2 in having a further feature comprising a tubular (e.g. generally cylindrical) solenoid coil bobbin support sleeve or liner 150 disposed between the molded plastic coil bobbin 21 and the armature 22 to maintain valve response stability over time at service temperatures to which the valve components are exposed in service. Other valve components of FIG. 7 are similar to those described above in connection with FIGS.

1-2. The sleeve or liner 150 is disposed in trap or slight interference fit in the bore of bobbin 21. In particular, in the embodiment of FIGS. 1-2, the coil bobbin 21 may experience thermal drift due to thermoplastic creep, thermal dimensional change or the like, over time at service temperatures to which the valve may be exposed. In use in a vehicle transmission module, service temperatures may range from −40 degrees C. to 150 degrees C. Such thermal drift of the bobbin 21 may cause the permanent magnet position to drift or be displaced in an axial direction to an extent that valve response is altered over time. The sleeve or liner 150 is disposed to complete a solid axial stacking path, where certain valve components are axially abutted from permanent magnet 34 to a flux washer W in a manner to reduce possibility of axial drift of the permanent magnet that could affect valve response over time. For example, one end of the sleeve or liner 150 axially abuts the flux washer W while the other enlarged end, together with the permanent magnet 34, axially abuts and traps the outer periphery of the plate spring 24. The sleeve or liner 150 can comprise brass or any other appropriate metallic material or other material. An axial space or gap 152 is provided between the axial end of the coil bobbin 21 and the adjacent flux washer W to accommodate possible thermal drift of the bobbin assembly over time at the service temperatures of the valve, avoiding harmful drift of the permanent magnet 34.

Although certain preferred embodiments of the proportional variable force solenoid valve and fluid control device for an electronic transmission of the invention have been shown and described in detail, it should be understood that variations or modifications may be made without departing from the spirit or scope of the present invention.

We claim:

1. Solenoid fluid control valve, comprising a solenoid coil, an armature movable in response to electrical current applied to the solenoid coil, a valve member for controlling fluid flow to a fluid passage, an actuator pin disposed between the armature and the valve member for moving the valve member in response to armature movement, and wherein the actuator pin includes a tubular sleeve attached thereon and spaced from the actuator pin to form a space around the actuator pin with the space closed off at an end thereof where the sleeve is attached on the actuator pin and wherein the tubular sleeve includes an annular chamfered or radiused exhaust sealing edge at an opposite end of the space to engage a seating surface of an exhaust seat insert disposed downstream of the valve member, said seating surface extending substantially perpendicular to the longitudinal axis of the actuator pin, to close off fluid flow to an exhaust port when the armature is at an end position of the armature stroke where the valve member is unseated a maximum distance from its seat by the actuator pin.

2. The fluid control valve of claim 1 wherein the end is chamfered at an acute angle to form the exhaust sealing edge.

3. The fluid control valve of claim 1 wherein the end is radiused to form the exhaust sealing edge.

4. The fluid control valve of claim 1 further including a permanent magnet disposed about an outer armature end that is supported by a plate spring in a bore of a coil bobbin.

5. The fluid control valve of claim 1 wherein the space around the actuator pin is disposed oppositely from an exhaust orifice of the exhaust seat insert.

6. Solenoid fluid control valve, comprising a solenoid coil, an armature movable in response to electrical current applied to the solenoid coil, a valve member for controlling fluid flow to a fluid passage, an actuator pin disposed between the armature and the valve member for moving the valve member in response to armature movement, and wherein the actuator pin includes a tubular sleeve fixedly attached thereon and spaced from the actuator pin to form a space around the actuator pin with the space closed off at an end where the tubular sleeve is attached and with the space open at an opposite end facing an exhaust orifice of an exhaust seat insert disposed downstream of the valve member, said tubular sleeve having an annular chamfered or radiused exhaust sealing edge at the opposite end of the space to engage a seating surface of the exhaust seat insert to close off fluid flow through the exhaust orifice to an exhaust port when the armature is at an end position of the armature stroke where the valve member is unseated a maximum distance from its seat by the actuator pin.

7. The fluid control valve of claim 6 wherein the seating surface of the exhaust seat insert extends substantially perpendicular to a longitudinal axis of the actuator pin.

\* \* \* \* \*